United States Patent
Toda et al.

(10) Patent No.: US 7,170,838 B2
(45) Date of Patent: Jan. 30, 2007

(54) INFORMATION RECORDING AND REPRODUCING APPARATUS

(75) Inventors: Tsuyoshi Toda, Kodaira (JP); Toshimitsu Kaku, Sagamihara (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 300 days.

(21) Appl. No.: 10/442,530

(22) Filed: May 20, 2003

(65) Prior Publication Data

US 2004/0141432 A1   Jul. 22, 2004

(30) Foreign Application Priority Data

Jan. 17, 2003   (JP)   ............... 2003-009003

(51) Int. Cl.
*G11B 7/00* (2006.01)
(52) U.S. Cl. ............... 369/53.35; 369/47.51; 369/53.36; 369/59.11
(58) Field of Classification Search ........... 369/47, 369/47.51, 53.35, 53.36, 59.11
See application file for complete search history.

(56) References Cited

U.S. PATENT DOCUMENTS

| | | | | |
|---|---|---|---|---|
| 5,414,451 A | * | 5/1995 | Sugiyama et al. | 347/258 |
| 6,646,968 B1 | * | 11/2003 | Miyaoka | 369/53.31 |
| 6,807,134 B2 | * | 10/2004 | Nakajima et al. | 369/47.35 |
| 2002/0141308 A1 | * | 10/2002 | Matsumoto | 369/47.53 |
| 2004/0165508 A1 | * | 8/2004 | Gushima et al. | 369/59.11 |

FOREIGN PATENT DOCUMENTS

| | | | |
|---|---|---|---|
| JP | 09-161272 | * | 6/1997 |
| JP | 2002-304732 | * | 10/2002 |

OTHER PUBLICATIONS

Translation of JP 2002-304732.*
Translation of JP 9-161272.*

* cited by examiner

*Primary Examiner*—Andrea Wellington
*Assistant Examiner*—Linh T. Nguyen
(74) *Attorney, Agent, or Firm*—Townsend and Townsend and Crew LLP

(57) ABSTRACT

An optical information recording and reproducing apparatus that determines the quality of recorded information through a beta value from information on the amplitude of a reproduced signal and if the beta value is outside the permissible range, outputs information on error to a host computer. Immediately after the information is recorded the information is reproduced first and second kinds of information including information on the amplitude of the reproduced signal and performance information or error information obtained from a binarized signal of that reproduced signal, respectively are used to determine the quality of the reproduced signal. Recording power condition is changed based on the first kind of information and a recording pulse width condition or reproduction condition is changed based on the second kind of information to ensure the reliability of the information recorded.

14 Claims, 6 Drawing Sheets

REPRODUCED SIGNAL OBTAINED THROUGH LOW POWER RECORDING

REPRODUCED SIGNAL OBTAINED THROUGH NORMAL POWER RECORDING

REPRODUCED SIGNAL OBTAINED THROUGH HIGH POWER RECORDING

INFORMATION RECORDING AND REPRODUCING APPARATUS

BACKGROUND OF THE INVENTION

1. Field of the Invention

This invention relates to an information recording and reproducing apparatus that records onto and reproduces from an information recording medium, and more particularly, this invention concerns information recording and reproducing technology for recording and reproduction using laser beams.

2. Description of the Related Art

Information recording and reproducing apparatuses of the prior art capable of recording information to an optical recording medium such as an optical disk for example and reproducing that information (for example JP-A-9-161272, Pages 4–6, FIG. 1), operate by reproducing part of the recorded information after recording it to a data area, then calculating a beta value for that reproduced signal and if that beta value is outside the permissible range, information on errors is output to a host computer.

SUMMARY OF THE INVENTION

With such an optical information recording and reproducing apparatus of the prior art, however, the quality of recorded information is ascertained only through the beta value from information on the amplitude of the reproduced signal. If that beta value is outside the permissible values, error information is output to the host computer. Further, there is another problem that affects the process of determining the quality of information recorded. This is because that process involves dividing the recording area on which information is recorded into regions of a specific size and reproducing the recorded information of each individual sample region thus divided. If the recording quality is poor, however, it is not possible to perform processes to compensate for the recording quality quickly. Also, no mention is made in the technologies of the prior art about the processes needed to improve such defective recording quality.

In view of these problems in the prior art the object of the present invention is to provide an information recording and reproducing apparatus wherein the integrity of the information recorded is maintained through the recording quality. This object is achieved by reproducing information immediately after information is recorded in the data area and ascertaining the quality of the reproduced signal using two kinds of information: firstly information obtained on the amplitude of the reproduced signal (amplitude information), and secondly information on performance (performance information) or information on errors (error information) obtained from a binarized signal of the reproduced signal. Power conditions are then changed based on the first kind of information and recording pulse width conditions are changed based on the second kind of information to achieve recording quality wherein the integrity of the information recorded is maintained.

To achieve the above object, an aspect of the present invention provides an information recording and reproducing apparatus comprising means for detecting information on the amplitude of a reproduced signal and means for detecting performance information or error information obtained from a binarized signal of the reproduced signal, which apparatus operates through a controller to determine the quality of a reproduced signal using the two kinds of information of, information obtained from amplitude information of the reproduced signal, and performance information or error information obtained from the binarized signal of the reproduced signal, and make no changes to recording conditions if those two kinds of information indicate satisfactory conditions, but make changes to recording power conditions based on the first kind of information and changes to recording pulse width conditions based on the second kind of information to ensure reliability of the information recorded.

Other objects, features and advantages of the invention will become apparent from the following description of the embodiments of the invention taken in conjunction with the accompanying drawings.

DETAILED DESCRIPTION OF THE EMBODIMENTS

Figure 1:
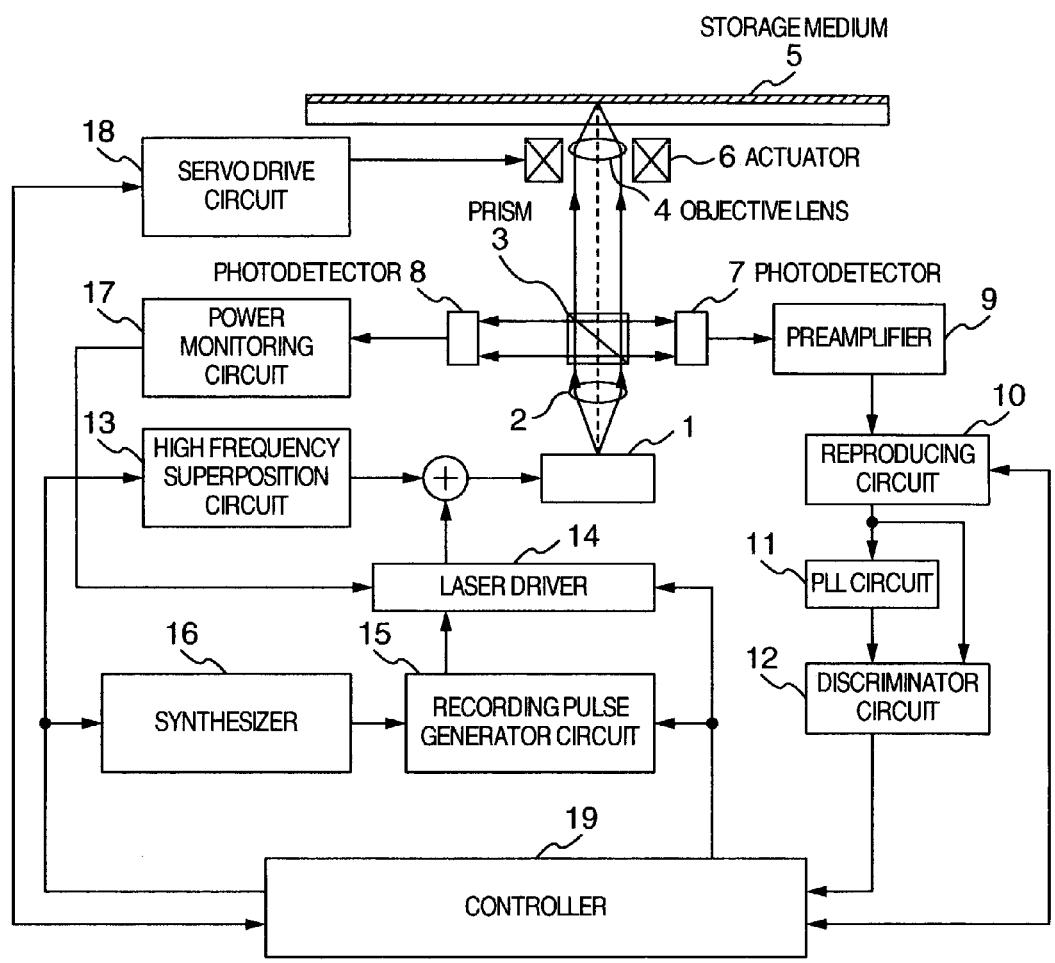
FIG. 1 is a block representation showing the configuration of an optical information recording and reproducing apparatus according to an embodiment of the present invention.

Specific embodiments of the present invention will now be described, by way of example only, with reference to the accompanying drawings. FIG. 1 shows the configuration of an optical information recording and reproducing apparatus according to the present invention in which a reference numeral 1 is a semiconductor laser, 2 is a collimate lens that converts beams from the semiconductor laser into parallel beams, 4 is an objective lens that shapes the light spot, focusing the laser beam on the disk, 3 is a prism, 5 is an optical disk that includes a DVD disk that is a recording medium, 6 is an actuator for which controls shaping and positioning of the light spot formed in storage medium 5, numerals 7 and 8 are photodetectors, 9 is a preamplifier, 10 is a reproducing circuit, 11 is a PLL circuit, 12 is a discriminator circuit, 13 is a high frequency superimposing circuit, 14 is a laser driver, 15 is a recording pulse generator circuit, 16 is a synthesizer, 17 is a power monitoring circuit, 18 is a servo drive circuit and 19 is a controller.

The optical information recording and reproducing apparatus of this configuration basically comprises a recording processing system comprising an optical head centered around semiconductor laser 1, storage medium 5 for storing information and recording pulse generator circuit 15, and a reproduction processing system primarily comprising reproduction circuit 10 that converts reproduced signals obtained from the recording head into information. As clearly shown in the Figure, storage medium 5 that stores information comprises a recording layer and a substrate supporting the layer.

Information data and commands come from the upper host. Controller 19 decodes the commands and modulates the recording data, converting it into a code sequence corresponding to the modulation system being used. Synthesizer 16 is an oscillator that generates a reference clock for the entire apparatus. When using the ZCAV (Zoned Constant Angular Velocity) recording type which is a method for high capacity recording in which the reference clock is changed for each zone to achieve a substantially constant recording density the inner and outer circumferences of disk, the oscillating frequency of synthesizer 16 changes for each zone. Further, when the ZCLV (Zoned Constant Linear Velocity) recording type is used in which the revolutions of the spindle motor (not shown in the Figure) that drives storage medium 5 are changed, to achieve a substantially constant linear velocity between the inner and outer circumferences of disk, the oscillator frequency of synthesizer 16 remains constant.

The servo configuration (whether focus servo or tracking servo), controls the positioning and shape of the light spot for recording and reproducing information by, for example, acquiring a focus error signal and a tracking error signal from a cylindrical lens (not shown in the Figure) positioned in front of photodetector 7 formed of quad-detector and inputting these error signals into controller 19 (not shown in the Figure) from photodetector 7. After then servo signals are output to servo drive circuit 18 from controller 19, with objective lens 4 being moved by a driving current supplied to actuator 6.

When recording information, a code sequence modulated in accordance with original information data from controller 19 and a reference clock from synthesizer 16 are input to recording pulse generator circuit 15 and converted to a recording pulse sequence for controlling the length and width of a recording mark.

Next, these recording pulse sequences converted at recording pulse generator circuit 15 are first input to laser driver 14, and semiconductor laser 1 is made to produce high power oscillations by recording current supplied from laser driver 14. The light output from the semiconductor laser 1 first becomes parallel beams at collimate lens 2, passing through prism 3 and being converged in storage medium 5 by objective lens 4. These processes facilitate recording of recording marks corresponding to the code sequence of the above recording pulse sequence.

High frequency superimposing circuit 13 is provided to reduce laser noise due to semiconductor laser 1. When information is recorded, erased or overwritten, the circuit 13 can discontinue high frequency superimposition based on the lifetime of the laser.

Figure 3:
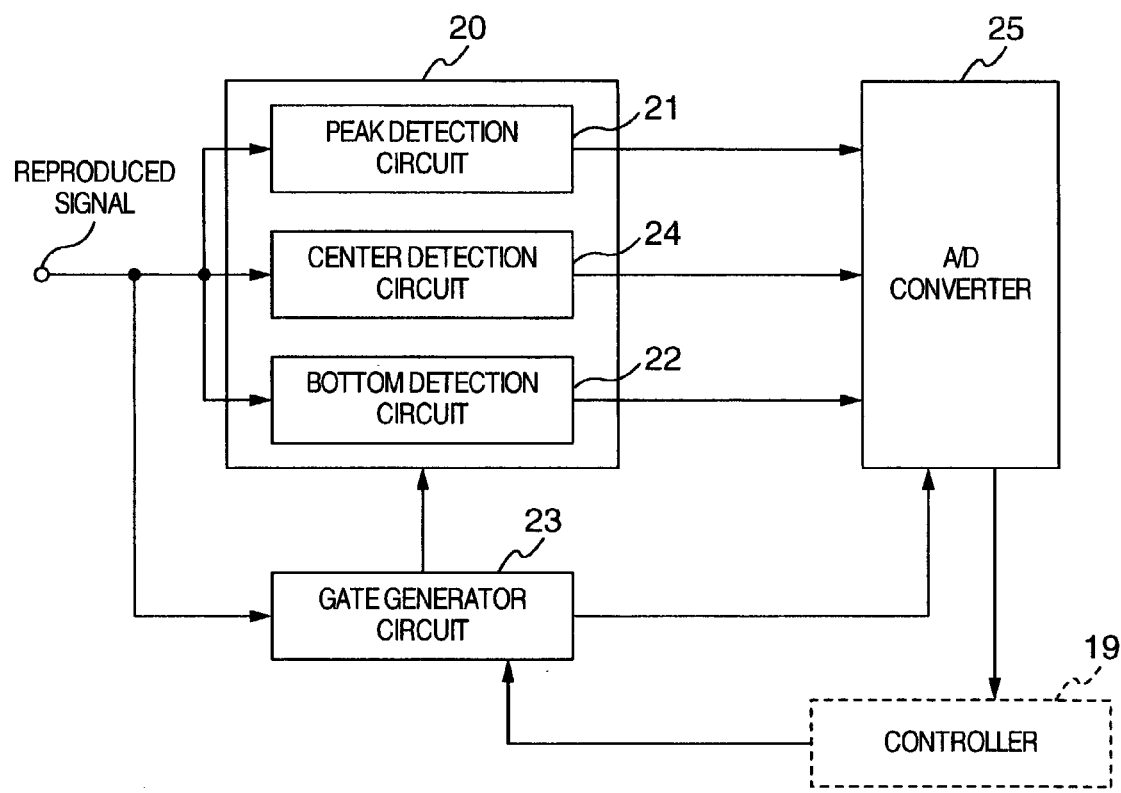
FIG. 3 is a block diagram showing the configuration of a circuit for detecting the amplitude level of a reproduced signal according to an embodiment of the present invention.

With an information recording and reproducing apparatus according to the embodiment of the present invention, when recorded information is reproduced as described above, semiconductor laser 1 is made to produce low-power oscillationing light and the oscillating light is injected into storage medium 5. The optical path of the reflected light from this storage medium 5 is split by prism 3 before the reflected light is injected into photodetector 7. After the light thus injected is photoelectrically converted at photodetector 7, it is amplified by preamplifier 9 and then input to reproduction circuit 10. In this reproduction circuit 10, which could be comprised for example of waveform equalization circuitry, automatic gain control circuitry and binarization circuitry, the reproduced signal thus input is converted into a binary signal. As shown in FIG. 3, reproduction circuit 10 includes peak, center and bottom level detecting circuits for detecting the amplitude level of the reproduced signal.

The binary signal output from reproduction circuit 10 is then input to PLL (Phase Locked Loop) circuit 11 for self clocking. The binary signal and a reproduction clock signal synchronized with the binary signal, acquired through the PLL circuit, are then input to discriminator circuit 12 to discriminate the data, and the resulting data signal is input to controller 19. In this way, the data is demodulated.

Figure 2A:
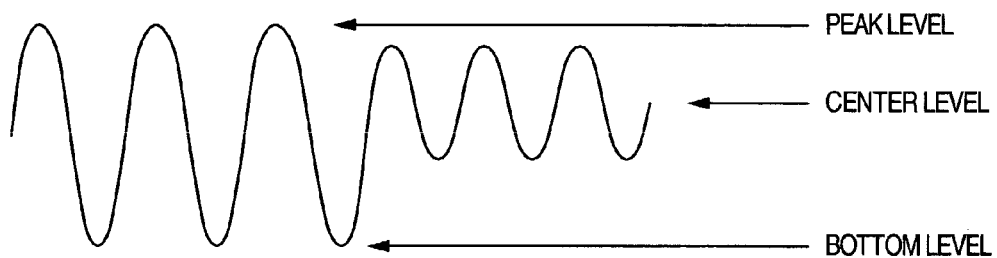
FIGS. 2A–2C show changes to a reproduced signal with variation of recording power.
Figure 2B:
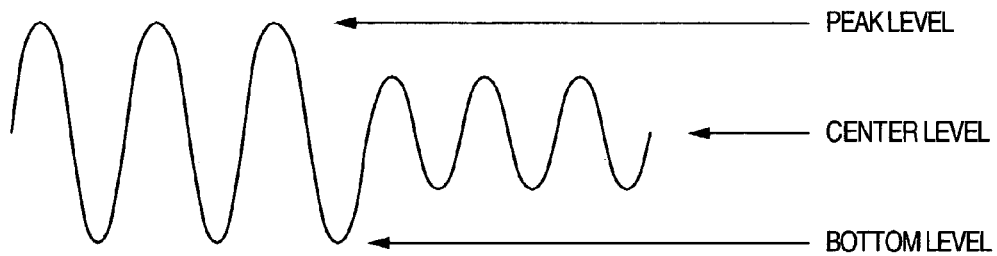
Figure 2C:
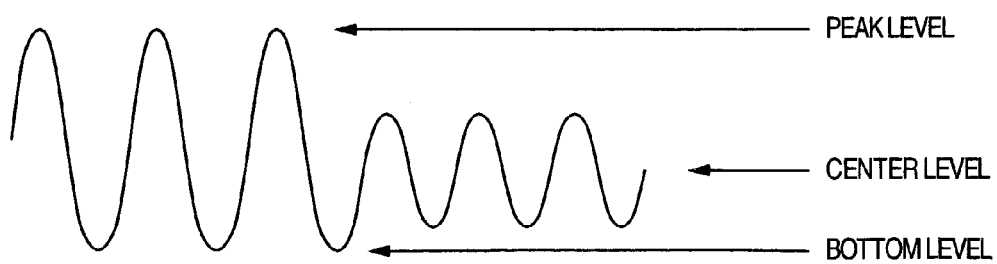

Changes in a reproduced signal due to varying recording power will now be described with reference to FIGS. 2A–2C. In FIG. 2A shows the reproduced signal obtained through low power recording, FIG. 2B shows the reproduced signal obtained through appropriate/optimized power recording and FIG. 2C shows the reproduced signal obtained through high power recording. The changes in amplitude of the reproduced signal are easily discernible here shown in one example of a reproduced signal illustrated through the combination of the long and short marks. The mark part is shown to extend to the lower side in the Figure, and the space part is shown as extending up into the upper side. The part shown by long spaces represents the peak level of the reproduced signal, the part shown by the lower part of the longer part of the mark represents the bottom level of the reproduced signal and the average level of the marks and spaces of reproduced signal represents the center level. This center level is positioned substantially in the center of the amplitude level of the short mark and the short space. Beta values from these three levels can be obtained as expressed below.

$$\text{Beta} = (A1 + A2)/(A1, A2) \qquad \text{Expression (1)}$$

A1=peak level−center level
A2=bottom level−center level

In this way, beta values can be calculated from the three levels, the peak level, center level and bottom level and it becomes possible to control recording power from the relationship of these beta values for recording power.

The configuration of the circuitry for detecting the amplitude level of reproduced signals that is included in reproduction circuit 10 will now be described with reference to FIG. 3. Separately from the data discrimination in reproduction circuit 10 the reproduced signal output from preamplifier 9 is divided to be input to envelope detection circuit 20, where the peak level of the reproduced signal is detected by a peak detection circuit 21, the bottom level of the reproduced signal is detected by a bottom detection circuit 22 and the center level is detected by a center detection circuit 24. Peak detection circuit 21 detects the amplitude level that in FIG. 2 is the part shown by the long spaces (the upper side of the Figure), the bottom detection circuit 22 detects the amplitude level that in FIG. 2 is the part shown by the longer part of the mark (the lower side of the Figure) and the center detection circuit 24 detects the amplitude level that in FIG. 2 is positioned substantially in the center amplitude level where the marks and spaces are short.

Here, gate generating circuit 23 receiving instructions from controller 19, controls peak detection circuit 21, bottom detection circuit 22, center detection circuit 24 and AD converter 25 to detect the peak level, center level and bottom level of the reproduced signal when reproduction begins immediately after recording. AD converter 25 performs AD conversion of the peak level, center level and bottom level supplied to it and this converted amplitude data is stored in controller 19. The controller 19 can calculate the beta values using the stored data in accordance with the Expression (1).

The relationship between beta values and PI (Parity of Inner-code) errors to recording power will now be described with reference to FIG. 4.

PI is one kind of information for processing errors, used for DVD,ROM/RAM/R/RW or the like. In FIG. 4, recording power is shown on the horizontal axis or abscissa, while the beta values and number of PI errors are plotted on the left and right sides respectively of the vertical axis or ordinate 100% recording power is an optimum level of recording power set in advance. Recording pulse width also, is optimized for this 100% recording power level. Under these conditions the actual measurement for the beta value, that constitutes information on the amplitude of the reproduced signal, is approximately 7% and the error information (number of PI errors) obtained from the binarized signal is 0. To the extent that this number of PI errors increases, the integrity of the information decreases. Actually however, through implementing processes like error correction processes for example, the integrity of information can be maintained even with some degree of PI errors. The maximum number of PI errors is 208, and a value of 100 or less must be ensured at least in performance. Considering compatibility issues, however, things like reproduction margins, when information recorded is reproduced on another information recording and reproducing apparatus, the recording quality should be made as good as possible. If recording power is decreased in relation to the optimized 100% recording power, in addition to the beta value decreasing, the number of PI errors rapidly increases from about the 80% recording power area. As the recording power increases, in addition to the beta value increasing the number of PI errors increases from the vicinity of about 120% recording power. Accordingly, with the beta value at about 7%, in addition to achieving the optimum recording power the number of PI errors is about 0 and the integrity of the information is maintained. As illustrated in FIG. 4, there is a co-linear approximation between recording power and the beta value.

The relationship between beta values and PI (Parity of Inner-code) errors as reproduction performance deteriorates will now be described with reference to FIG. 5.

Figure 4:
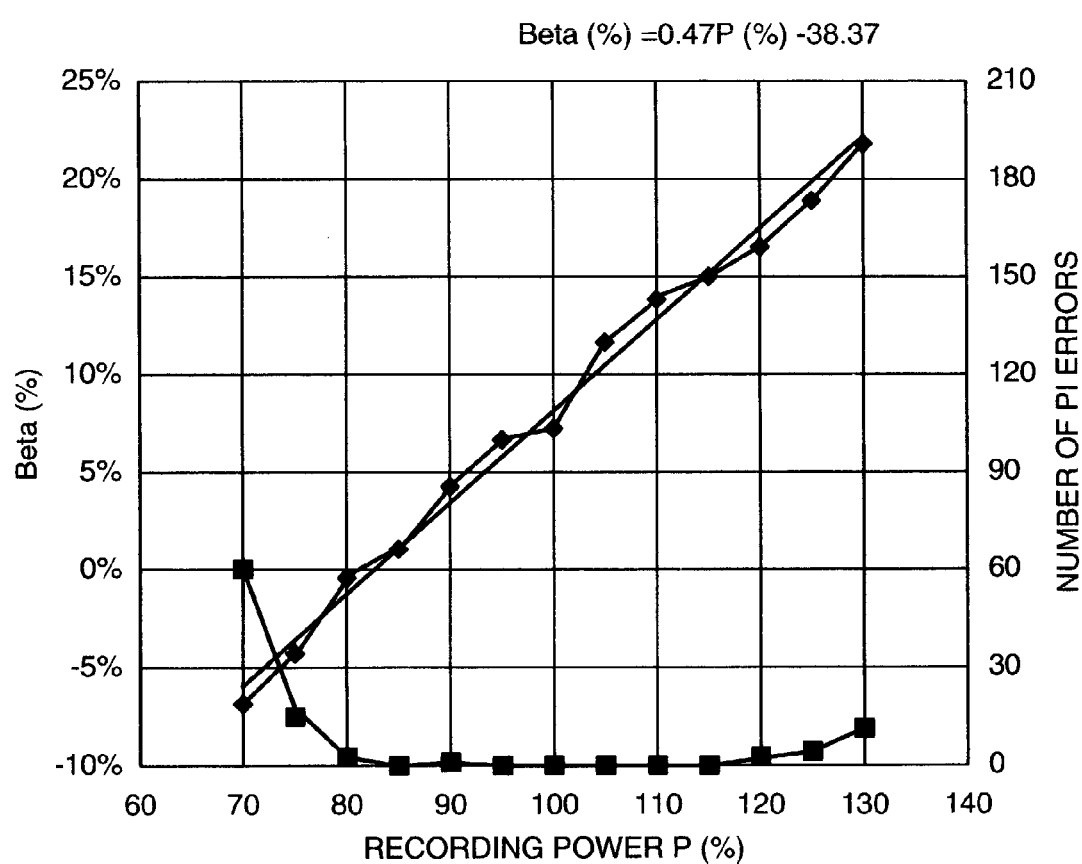
FIG. 4 shows the relationship according to the embodiment of the present invention, between PI (parity inner code) errors and the beta value for recording power.
Figure 5:
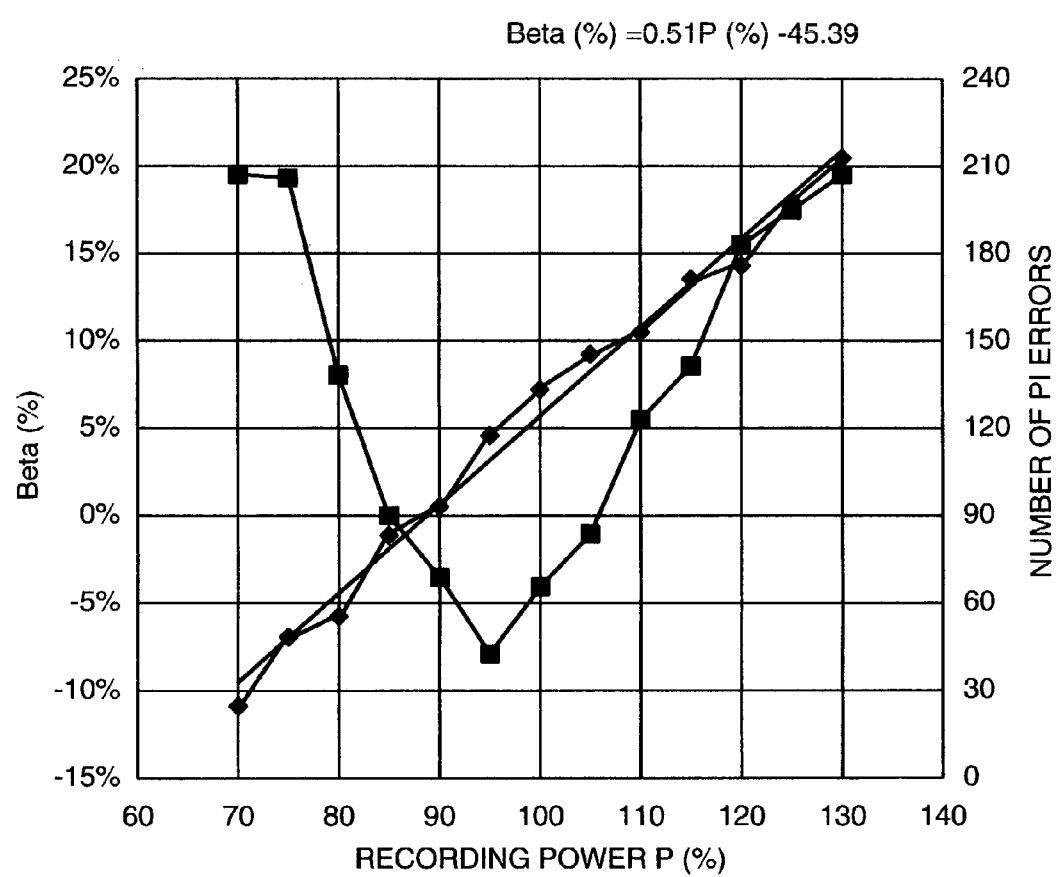
FIG. 5 illustrates deterioration of reproduction performance connected to the relationship with PI errors and the beta value for recording power according to the embodiment of the present invention.

FIG. 5 is obtained as a result of taking the marks recorded on/recording marks obtained from FIG. 4 and reproducing, with an AF offset (one component of reproduction performance) of about 0.56 μm applied to the values of FIG. 4 (that are the optimized AF offset values).

The same components as are plotted on the horizontal and vertical axes of FIG. 4 appear on the same axes of FIG. 5. At optimum recording power 100%, the number of PI errors exceeds 60 while the beta value is around the 7% vicinity. With recording power at below 80% there is a rapid increase in the number of PI errors to 100 or more, and it is not possible to maintain information integrity. Further, with recording power at 110% or above, naturally the number of PI errors increases rapidly to 100 or more and it is not possible to maintain integrity of the information. Here, conditions as reproduction performance deteriorates have been described with reference to FIG. 5, but the same kind of characteristics as described with reference to FIG. 5 would be obtained if describing conditions where there is no problem with reproduction performance, as for example with reproduction conditions of FIG. 4 and with non optimized recording pulse width. This means that if recording power is optimized it is possible to attain an amplitude of the reproduced signal where there are no performance problems. However, because the recording pulse width is not optimized, the length of the mark recorded and the length of the spaces deviate from the prescribed length, the number of PI errors increases even with recording power at the optimum level. Furthermore, when recording power deviates from the optimum recording power, naturally, the number of PI errors increases rapidly to 100 or more, and it is not possible to maintain the integrity of the information.

It has been described above with reference to FIG. 5 that the same relationship between beta values and PI errors applies when reproduction performance deteriorates and when the recording pulse width is not optimized. Accordingly, when the recording pulse width is optimized reproduction performance must be improved. When the recording pulse width is not optimized it must be optimized.

Figure 6:
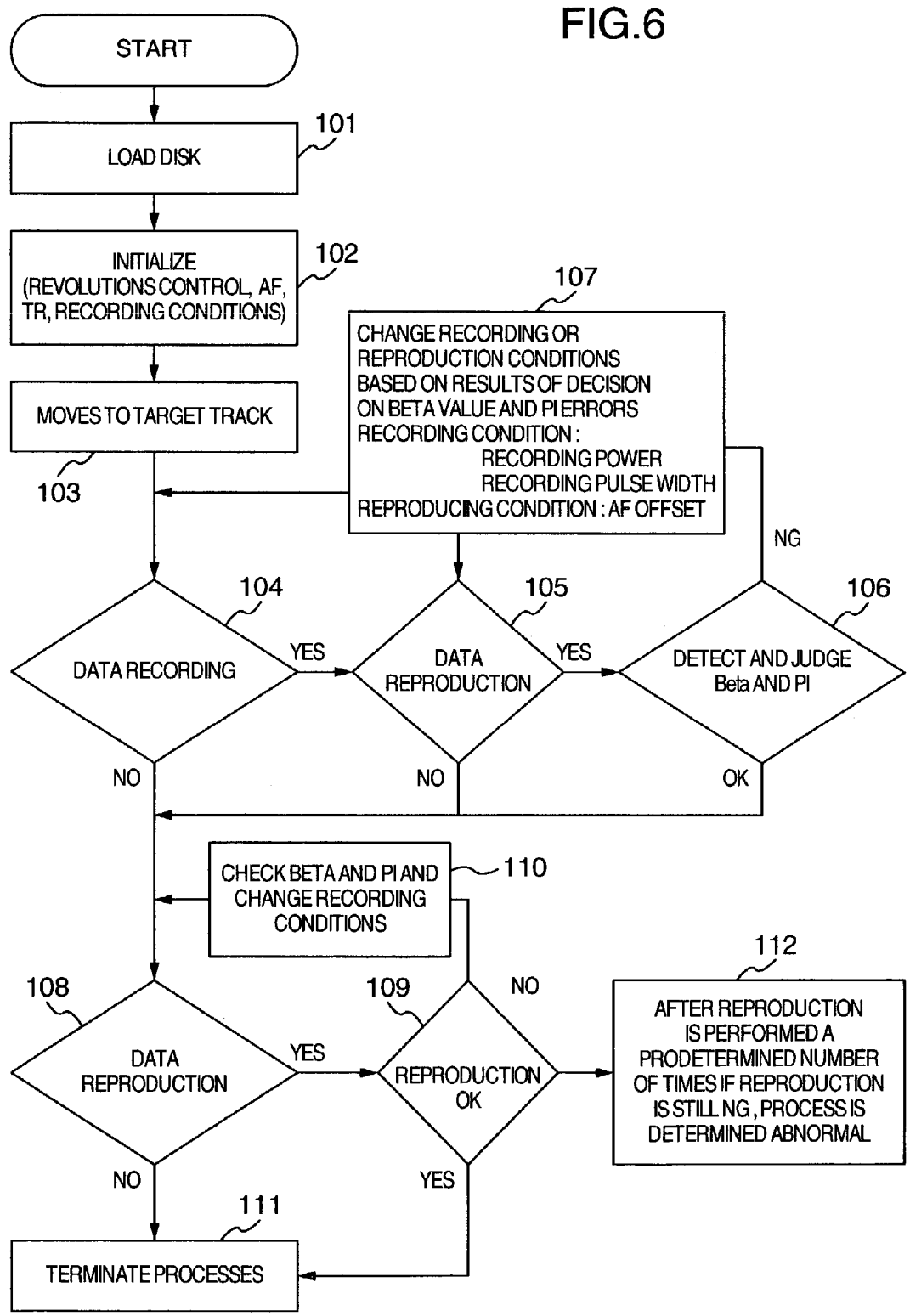
FIG. 6 is a flow chart showing the flow of processes according to the embodiment of the present invention.

The flow of processes according to the present invention will now be described with reference to FIG. 6. Operations where no learning is conducted on the recording conditions of recording power and recording pulse width will be described first.

After a disk is louded at step 101, at step 102 the initial settings of revolutions control, AF offset and TR offset are made and the initial recording conditions are set to commence operations. Initial recording conditions refers to the read-in of information such as control data stored in advance on a storage medium, and controller 19 sets recording conditions as the initial conditions for laser driver 14, recording pulse generator circuit 15 and synthesizer 16. At step 103 the head moves to the desired track to perform data recording at step 104. When reproducing data after the data is recorded, data reproduction is performed at step 105. Next, the beta value and the number of PI errors are detected at step 106. If the beta value and the number of PI errors exceed prescribed or predetermined values, the recording conditions or reproduction conditions are changed at step 107. Here, the following processes are performed for the beta value and the number of PI errors.

When no learning is conducted on recording conditions
(1) if the beta value is at the predetermined value and the number of PI errors exceeds the predetermined value, learning is performed on the recording pulse width,
(2) if the number of PI errors is at the predetermined value and the beta value exceeds the predetermined value, learning is performed on the recording power,
(3) if both the beta value and the number of PI errors exceed their predetermined values, learning is performed on the recording power and the recording pulse width.

When learning is performed on the recording conditions
(4) if the beta value is at the predetermined value and the number of PI errors exceeds the predetermined value, learning is performed on the reproduction conditions,
(5) if the number of PI errors is at the predetermined value and the beta value exceeds the prescribed value, learning is performed on the recording power,
(6) if both the beta value and the number of PI errors exceed their predetermined values, learning is performed on the recording power and the recording conditions.

These processes are repeated to achieve beta values and PI error numbers within the predetermined scope. Here, learning on the recording power is performed to obtain the relationship between recording power and beta values. As shown in FIG. 4, as linearization exists between the recording power and the beta value, the target beta value can be obtained from control data, so that the recording power level corresponding to the target beta value can be obtained from the linearization. By performing this operation once on for example a test area of the recording medium, thereafter, the obtained co-linear approximation can be used to calculate the optimum recording power by controller 19 from the beta value as detected, and obtain the optimum recording power.

Next, once the beta value and number of PI errors fall within the predetermined ranges, data reproduction step 108 is performed. If data reproduction is not performed however, the flow proceeds to termination of processes at step 111. When data reproduction is performed, data reproduction takes place at step 108 and if the reproduced data is read in normally, the flow of processes proceeds to termination at step 111. If however the data read in is not normal, as shown for step 110, in addition to performing checks on the beta value and number of PI errors, reproduction conditions are changed and the reproduction operation is performed over again. Here, changes to reproduction conditions refers to situations as described for FIG. 5 where a new value is set to correct an irregular AF offset value, but beyond that, other conditions like waveform equalization conditions for example may also be changed. Further, the description of processes made with reference to FIG. 6 envisages conditions under which no learning had been performed when the disk was loaded, however the operations of (4) through (6) above can be performed when learning is performed when the disk is loaded. Especially in the case of learning for recording pulse width, if performed once after the disk is loaded, it need not be performed again thereafter. If however the disk is re-loaded or changes are made to the configuration of the recording and reproducing apparatus, it is preferable that learning for recording pulse width be performed again as the integrity of the information recorded is maintained.

When the beta value and number of PI errors are detected as above, if changes are made to recording or reproduction conditions based on those two kinds of values it is preferable that these changes be performed using the minimal unit of the recording data but the integrity of information recorded can be maintained by setting optimum recording conditions and reproduction conditions after detecting the beta value and number of PI errors based on information from power monitoring circuit 17 that constantly monitors recording power or when the temperature of the environment (as detected by a temperature sensor installed in controller 19 or a temperature sensor not shown in the Figures) changes substantially.

The present invention enables the integrity of information to be maintained, as two kinds of information, that is analog information, for example, the amplitude level of a recorded signal and digital information, for example PI errors are used to determine the integrity of recorded information, and then changes are made to recording conditions and reproduction conditions based on the combination of those two kinds of information.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information recording and reproducing apparatus capable of recording information to, reproducing from an information recording medium or erasing information on the information recording medium, by irradiating the information recording medium with an oscillating laser beam and forming on a data area of the information recording medium, a recording region physically different to a portion to which information has not been recorded, the apparatus comprising:

means for detecting amplitude information of a reproduced signal, the reproduced signal being based at least in part on recorded user information generated from a write operation, and means for detecting performance information or information on error information obtained from a binarized signal of the reproduced signal, wherein the apparatus:

performs the write operation to record user information on the information recording medium after performing an initial write condition learning operation, wherein the recorded user information is played back during a playback operation;

performs a reproducing operation of the recorded user information to generate the reproduced signal;

operates to judge a quality of the reproduced signal using the amplitude information of the reproduced signal and the performance information or error information obtained from the binarized signal of the reproduced signal; and makes changes to recording conditions or reproduction conditions immediately after performing the reproducing operation based on the quality of the reproduced signal, wherein the changes to recording conditions include changing recording power based on the amplitude information of the reproduced signal and/or changing a recording pulse width based on the error information or performance information obtained from the binarized signal of the reproduced signal.

2. An information recording and reproducing apparatus according to claim 1 wherein the amplitude information of the reproduced signal is detected during the reproducing operation.

3. An information recording and reproducing apparatus according to claim 1 wherein the reproduction conditions include AF offset and waveform equalization conditions.

4. An information recording and reproducing apparatus capable of recording information to, reproducing from an information recording medium or erasing information on the information recording medium, by irradiating the information recording medium with an oscillating laser beam and forming on a data area of the information recording medium, a recording region physically different to a portion to which information has not been recorded, the apparatus comprising:

means for detecting amplitude information of a reproduced signal, and means for detecting performance information or information on error information obtained from a binarized signal of the reproduced signal, wherein the apparatus:

operates to judge a quality of the reproduced signal using the amplitude information of the reproduced signal and performance information or error information obtained from the binarized signal of the reproduced signal;

detects changes of the amplitude information of the reproduced signal in relation to recording power before performing a subsequent write operation;

during write operation after performing an initial write condition learning operation, detects the amplitude information of the reproduced signal if performance information or error information obtained from the binarized signal of the reproduced signal is normal when the subsequent recorded user data is played back;

calculates optimum recording power from the amplitude information of the reproduced signal and the changes of the amplitude information of the reproduced signal in relation to recording power;

changes recording conditions based on the optimum recording power and performs the subsequent write operation on the information recording medium, wherein the subsequent write operation records user information on the information recording medium, the subsequent recorded user information played back during a subsequent playback operation.

5. An information recording and reproducing apparatus capable of recording information to, reproducing from an information recording medium or erasing information on the information recording medium, by irradiating the information recording medium with an oscillating laser beam and forming on a data area of the information recording medium, a recording region physically different to a portion to which information has not been recorded, the apparatus comprising:

means for detecting amplitude information of a reproduced signal, means for detecting performance information or information on error information obtained from a binarized signal of the reproduced signal, and means for detecting an output of a laser beam, wherein the apparatus:

operates to judge a quality of the reproduced signal using the amplitude information of the reproduced signal and performance information or error information obtained from the binarized signal of the reproduced signal;

detects changes of the amplitude information of the reproduced signal in relation to recording power before performing a subsequent write operation;

during write operation after performing an initial write condition learning operation, detects the amplitude information of the reproduced signal if performance information or error information obtained from the binarized signal of the reproduced signal is normal when the subsequent recorded user data is played back;

calculates optimum recording power immediately before changing recording conditions from the amplitude information of the reproduced signal and the changes of the amplitude information of the reproduced signal in relation to recording power and an information obtained from means for detecting an output of a laser beam;

changes recording conditions based on the optimum recording power; and performs the subsequent write operation on the information recording medium.

6. An apparatus comprising:

an optical recording medium;

a semiconductor laser configured to produce an oscillating laser beam used to record user information onto the optical recording medium after performing an initial write condition learning operation, the recorded user information played back during a playback operation;

a reproducing module configured to generate a reproduced signal based at least in part on the recorded user information and to detect amplitude levels of the reproduced signal;

a controller coupled to the semiconductor laser, the controller configured to detect performance levels or error levels based at least in part on a digital signal of the reproduced signal, and to change a plurality of recording conditions of the semiconductor laser, wherein the controller is further configured to adjust power of the oscillating laser beam based on the amplitude levels of the reproduced signal and to adjust pulse width conditions of the oscillating laser beam based at least in part on performance levels or error levels of the digital signal, wherein subsequent user information is recorded on the optical recording medium in accordance with the adjusted power and/or pulse width conditions, the subsequent recorded user information played back during a subsequent playback operation.

7. The apparatus according to claim 6 wherein the optical recording medium comprises a DVD disk.

8. The apparatus according to claim 6 wherein the reproducing module comprises peak, center, and bottom level detecting circuits for detecting amplitude levels of the reproduced signal.

9. The apparatus according to claim 6 wherein the recording conditions include AF offset and waveform equalization conditions.

10. The apparatus according to claim 6 wherein the performance levels comprise beta values, and the error levels comprise PI (parity of inner-code) errors.

11. The apparatus according to claim 10 wherein the beta values are based at least in part on a peak, center, and bottom level of the reproduced signal.

12. A method of recording data, the method comprising:

(i) performing an initial write condition learning operation:

(ii) writing user information to a target track that can be played back during a playback operation;

(iii) generating a reproduced signal based at least in part on the user information written to the target track;

(iv) detecting amplitude levels of the reproduced signal;

(v) detecting performance levels or error levels based at least in part on a digital signal of the reproduced signal;

(vi) adjusting power and/or pulse width of a recording head if performance levels or error levels exceed predetermined thresholds of at least one of the amplitude levels, performance levels, or error levels; and (vii) subsequent to adjusting, rewriting user information to the target track, wherein the rewritten user information can be played back during a subsequent playback operation.

13. The method according to claim 12 further comprising:

repeating steps (iii)–(vii) until the performance levels or error levels do not exceed the predetermined thresholds.

14. The method according to claim 13 further comprising:

designating an error if steps (iii)–(vii) are repeated a predetermined number of times.

* * * * *

UNITED STATES PATENT AND TRADEMARK OFFICE
CERTIFICATE OF CORRECTION

PATENT NO.        : 7,170,838 B2                                   Page 1 of 1
APPLICATION NO.   : 10/442530
DATED             : January 30, 2007
INVENTOR(S)       : Toda et al.

It is certified that error appears in the above-identified patent and that said Letters Patent is hereby corrected as shown below:

Cover Page, item (73):

"assignee: Hitachi-LG Data Storage, Inc., Tokyo (JP)"

Should read,

--assignees: Hitachi, Ltd., Tokyo (JP)
             Hitachi-LG Data Storage, Inc., Tokyo (JP)--

Signed and Sealed this

Twenty-fourth Day of November, 2009

David J. Kappos
*Director of the United States Patent and Trademark Office*